United States Patent [19]

Turner, Jr.

[11] Patent Number: 5,016,227

[45] Date of Patent: * May 14, 1991

[54] TOP MOUNTED BUOY SIGNALING DEVICE

[75] Inventor: John H. Turner, Jr., Cambridge, Mass.

[73] Assignee: Whistler Corporation, Westford, Mass.

[*] Notice: The portion of the term of this patent subsequent to Feb. 20, 2007 has been disclaimed.

[21] Appl. No.: 398,768

[22] Filed: Aug. 25, 1989

Related U.S. Application Data

[63] Continuation-in-part of Ser. No. 228,723, Aug. 4, 1988.

[51] Int. Cl.⁵ .............................................. H04B 1/59
[52] U.S. Cl. ............................................. 367/3; 367/2
[58] Field of Search ......................... 367/2, 3, 4, 5, 6; 455/100; 114/365; 441/89, 11, 12; 310/309

[56] References Cited

U.S. PATENT DOCUMENTS

| | | | |
|---|---|---|---|
| 3,860,900 | 1/1975 | Scudder | 367/6 |
| 3,916,628 | 11/1975 | Halpern et al. | 408/103 |
| 3,981,010 | 9/1976 | Michelsen | 342/55 |
| 4,025,791 | 5/1977 | Lennington et al. | 250/341 |
| 4,049,969 | 9/1977 | Salonimer et al. | 250/458.1 |
| 4,050,069 | 9/1977 | Schlussler | 342/33 |
| 4,058,774 | 11/1977 | Hughes | 330/4.3 |
| 4,099,050 | 7/1978 | Sauermann | 455/604 |
| 4,104,629 | 8/1978 | Isbister et al. | 342/43 |
| 4,121,102 | 10/1978 | Wilson | 250/341 |
| 4,126,822 | 11/1978 | Wahlstrom | 322/2 A |
| 4,281,326 | 7/1981 | Anderson | 342/43 |
| 4,364,049 | 12/1982 | Moore et al. | 342/43 |
| 4,398,195 | 8/1983 | Dano | 342/46 |
| 4,418,411 | 11/1983 | Strietzel | 371/67.1 |
| 4,476,469 | 10/1984 | Lander | 340/825.49 |
| 4,482,268 | 11/1984 | Stevenson et al. | 405/3 |
| 4,492,875 | 1/1985 | Rowe | 290/53 |
| 4,495,496 | 1/1985 | Miller, III | 340/825.54 |
| 4,510,495 | 4/1985 | Sigrimis et al. | 340/825.54 |
| 4,510,497 | 4/1985 | Onozawa | 342/51 |
| 4,684,949 | 8/1987 | Kalafus | 342/41 |
| 4,763,126 | 8/1988 | Jawetz | 340/985 |
| 4,781,144 | 11/1988 | O'Brien | 114/365 |
| 4,903,243 | 2/1990 | Turner | 367/3 |

OTHER PUBLICATIONS

Motorola Advance Information, MC145026-MC145029; pp. 7-27 to 7-37.
Motorola Semiconductor Products Inc., "MC3359 Confidential", Motorola Inc., 1981, DS9569.

Primary Examiner—Thomas H. Tarcza
Assistant Examiner—Daniel T. Pihulic
Attorney, Agent, or Firm—Weingarten, Schurgin, Gagnebin & Hayes

[57] ABSTRACT

A top mounted buoy signaling device for marine navigation which is selectively activated in response to a coded address signal. The buoy signaling device includes a buoy having a top mounted receiver assembly which is activated by a transmitter assembly. The receiver circuit, transmitter circuit and antennas therefor are printed on circuit boards. The transmitter circuit includes an encoder chip which is preset to provide a coded address. The coded address is utilized to modulate a carrier signal to provide a coded address signal to activate the receiver circuit. The receiver circuit includes a decoder chip which is preset to the coded address of the corresponding transmitter. A lamp driver subcircuit is enabled in response to the coded address signal. The lamp driver subcircuit includes a master timer subcircuit which maintains the driver subcircuit in an operative condition for a predetermined period of time and a flash timer subcircuit which periodically energizes a lamp to provide a flashed output. The receiver circuit may also include a power timer subcircuit to periodically energize the receiver circuit for short-interval operation and a sweep circuit to allow the receiver circuit to receive coded address signals within a predetermined bandwidth.

8 Claims, 6 Drawing Sheets

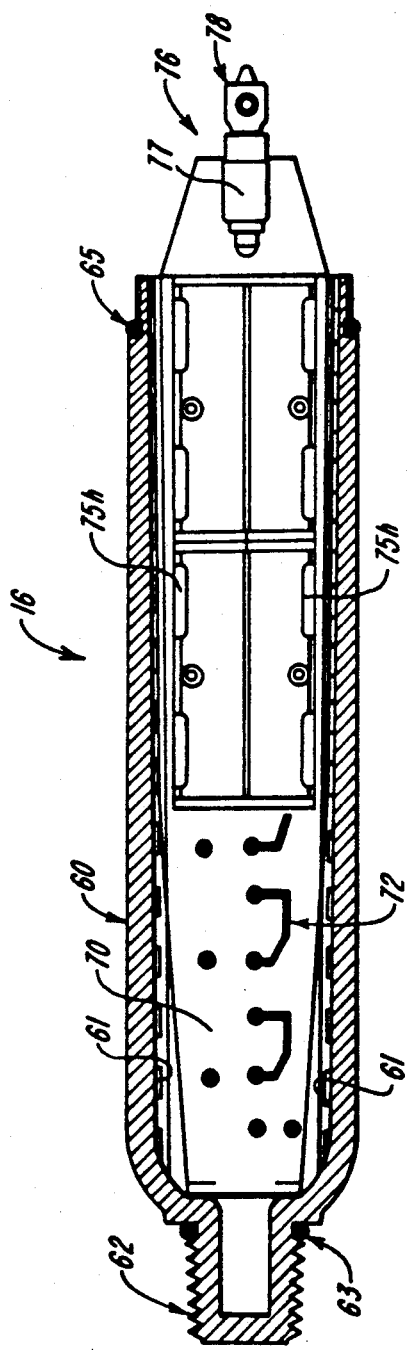
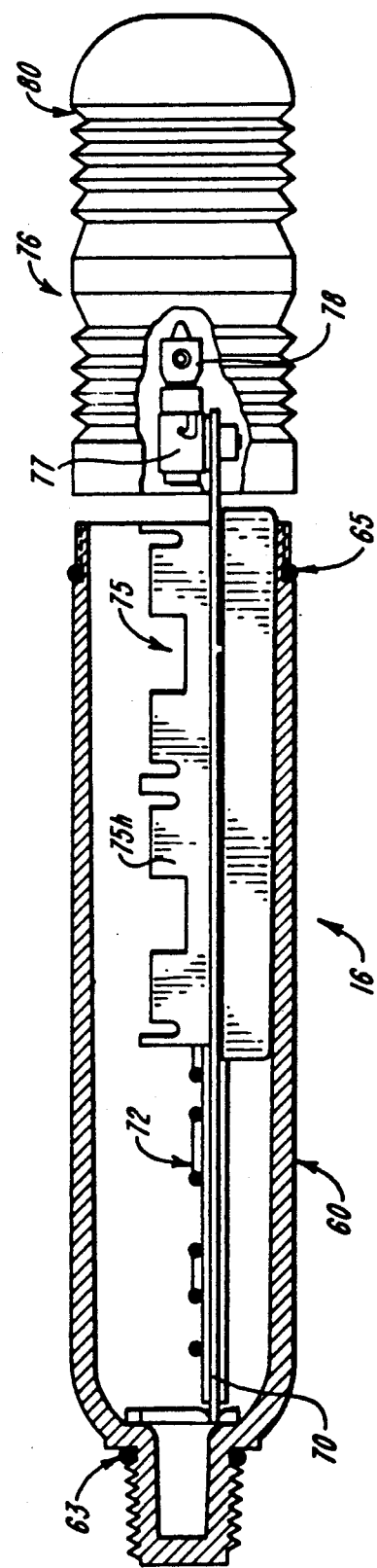
FIG. 3A
FIG. 3B

TOP MOUNTED BUOY SIGNALING DEVICE

RELATED APPLICATIONS

This application is a continuation-in-part of U.S. patent application Ser. No. 07/228,723, filed Aug. 4, 1988, entitled MARINE TRANSPONDER SYSTEM.

FIELD OF THE INVENTION

The present invention is directed to marine navigational systems, and more particularly to a top mounted buoy signaling device for marine navigation which is selectively activated in response to a coded address signal.

BACKGROUND OF THE INVENTION

Marine navigation is a process of piloting a vessel to a destination in a safe and expeditious manner. While sophisticated electronic equipment is available to aid in the navigation of larger vessels, the majority of mariners continue to navigate by using external reference marks.

A mark is any conspicuous object, natural or manmade, which has utility in establishing the position of a vessel or otherwise acting as a navigational aid. To be an effective navigational aid, each mark must be specifically identified and its position accurately known. Buoys, both lighted and unlighted, lighthouses and lightships are artificial marks designed and erected specifically to function as aids to navigation.

Buoys are the most numerous of all artificial aids to navigation. Buoys can function as daymarks based upon their shape, color and number. Some buoys, particularly those identifying turning points and channels, underwater obstructions, or mooring, docking or slip facilities, are provided with lights to facilitate night time navigation. Buoys may also incorporate horns, bells, whistles or radio transmitters as navigational signals.

Signal buoys require an internal power source to operate the lighting system. Batteries are typically utilized as the power source for buoys on the basis of cost and maintenance considerations. Batteries are typically hardwired into the signal circuitry of the buoy so that the signal source is continually draining energy from the battery.

Mooring, docking or slip facilities likewise require some type of signal source to facilitate nighttime use. The location of the facility or other factors may make it impractical to run a power line for continuous nighttime energization of the signal source. In addition, continuously operated signal sources used with mooring, docking or slip facilities may have a negative impact on navigation inasmuch as these facilities may not be marked on navigational charts, thereby providing a source of confusion for mariners. Therefore, as a practical matter steady-state signal sources used with mooring, docking or slip facilities are typically battery powered and manually activated for nighttime operation.

Battery systems, however, are inherently limited in that the constant power drain upon the battery causes it to become depleted in a short time. A depleted battery cannot effectively function as a power source, and therefore batteries for buoys or docking facilities must be replaced at periodic intervals. Not only is such periodic replacement time consuming, but a navigational hazard exists when any buoy remains unpowered for any length of time. Alternatively, an expensive solar recharging system or cabling must be used to maintain adequate power.

Although individual buoys and buoy networks are maintained by governmental organizations such as the United States Coast Guard, a need exists for a buoy device which may be used for private applications. Such a buoy device should have a configuration which is amenable to one person operations such as buoy emplacement and/or removal, which facilitates in situ servicing, and the buoy device should be reliable, inexpensive and suitable for prolonged use in the marine environment.

In addition, the buoy device should be configured for selective activation. Since the buoy devices may be used in or near lighted environments, the buoy device should provide a distinctive signal which may be readily identified in such environments.

SUMMARY OF THE INVENTION

The present invention is directed to a top mounted buoy signaling device which is suitable for private applications. The buoy signaling device is inexpensive, suitable for prolonged use in marine environments and has a configuration facilitating emplacement and/or removal. The configuration of the buoy signaling device also facilitates in situ servicing and/or component replacement. The device is designed to utilize off-the-shelf batteries as power sources.

The buoy signaling device is configured for selective activation by means of a coded address signal. When activated, the buoy signaling device provides a distinctive signal which is readily identified in backlit environments.

The buoy signaling device according to the present invention includes a buoy having a top mounted receiver assembly which may be remotely activated by a hand-held, low-power transmitter assembly. The transmitter assembly includes a transmitter circuit and antenna printed on a circuit board which is mounted within a water-tight housing. The transmitter circuit includes a encoder subcircuit means which contains a preset code and which is operative to generate a digitized coded address. The digitized coded address is utilized to modulate a carrier signal to provide a coded address signal for selectively activating the buoy. The transmitter circuit is readily operated by depression of a pushbutton.

The top mounted receiver assembly of the buoy includes a receiver circuit and antenna printed on a circuit board and a lamp subassembly mounted on the circuit board. The printed circuit board is mounted within a housing which is environmentally sealed against the marine environment. The receiver circuit includes a detector subcircuit for detecting the coded address signal and a decoder subcircuit for verifying the digitized coded address provided by the detector subcircuit. The decoding means is preset with the coded address corresponding to the respective transmitter circuit.

The lamp driver circuit is operative in response to the coded address signal to enable the lamp subassembly. The lamp subassembly includes a master timer subcircuit to maintain the lamp subassembly in an operative condition for a predetermined period of time. During the predetermined period of time a flash timer subcircuit periodically energizes a lamp to provide a flashed output. The flashed output is distinctive and readily identified against a backlit environment.

The receiver circuit may also include a power timing subcircuit which periodically activates the receiver circuit for a predetermined short interval for reception of the coded address signal. Periodic, short term operation of the receiver circuit extends the useful operating lifetime of the receiver assembly. The receiver circuit may also include a sweep subcircuit to permit the reception of coded address signals within a predetermined bandwidth.

BRIEF DESCRIPTION OF THE DRAWINGS

A more complete understanding of the present invention and the attendant advantages and features thereof will be more readily understood by reference to the following detailed description when considered in conjunction with the accompanying drawings wherein:

FIGS. 3A, 3B are first and second cross-sectional views of a receiver assembly of the top mounted buoy signaling device of the present invention;

DETAILED DESCRIPTION OF PREFERRED EMBODIMENTS

Figure 1:
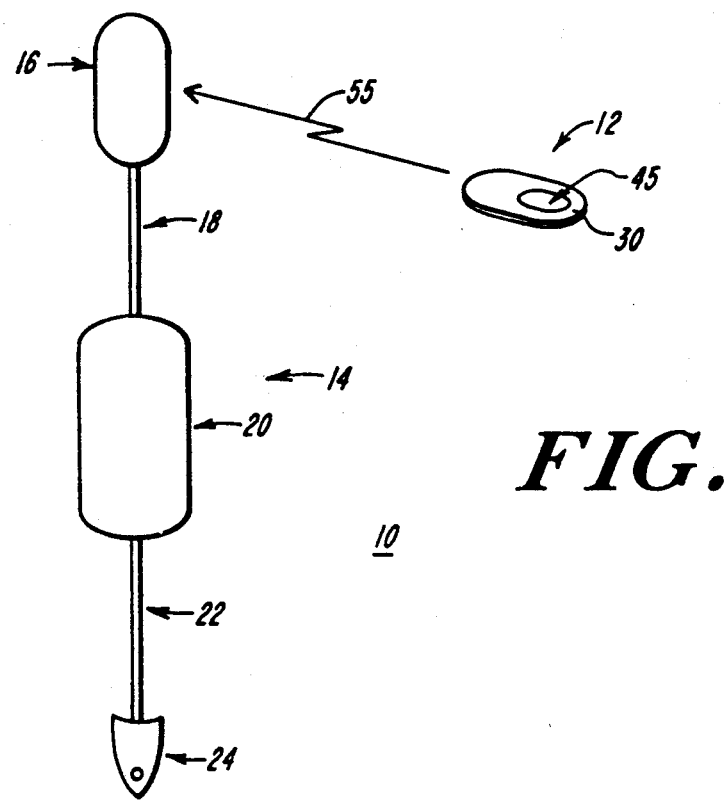
FIG. 1 is a plan view of one embodiment of a top mounted buoy signaling device according to the present invention.

Referring now to the drawings wherein like reference numerals designate corresponding or similar elements throughout the several views, one embodiment of a top mounted buoy signaling device 10 according to the present invention is exemplarily illustrated in FIG. 1. The buoy signaling device 10 includes a standalone buoy 14 which is remotely activated by a hand-held, low-power transmitter assembly 12.

The buoy 14 includes a top mounted receiver assembly 16, a support stanchion 18, a flotation member 20, a balance stanchion 22 and a weighted mooring eye 24. The buoy 14 may be fabricated from a durable, light-weight, corrosion-resistant insulative material such as plastic, for example an ASA, and may have an overall height of about 7 feet. Such a configuration greatly facilitates emplacement, repositioning and/or removal of the buoy in a marine environment, especially for single person operations.

All of the active elements of the buoy 14 are contained in the top mounted receiver assembly 16 as discussed hereinbelow in greater detail, thereby eliminating lengthy wiring. The top mounting configuration of the receiver assembly 16 also facilitates in situ servicing thereof.

For the embodiment illustrated in FIG. 1, the flotation member 20 and the weighted mooring eye 24 in combination support the buoy in the marine environment in a buoyant manner. The weighted mooring eye 24 may be used to anchor the buoy 14 in a predetermined position in the marine environment.

The support stanchion 18 provides spatial displacement of the top mounted receiver assembly 16 from the surface of the marine environment and also ensures that the receiver assembly 16 has an adequate RF field-of-view. Since the active components of the buoy 14 are contained in the receiver assembly 16, only a single environmental seal, as discussed hereinbelow, is required to protect the active components from the marine environment. The O-ring disposed intermediate the receiver assembly 16 and the support stanchion 18 functions as a "lock washer".

The buoy 14 illustrated in FIG. 1 is configured for flotation in a marine environment. It is to be understood, however, that the buoy signaling device of the present invention may have a configuration which facilitates mounting of the buoy signaling device in combination with artificial and/or natural objects found in the marine environment. For these applications, the buoy signaling device would comprise the top mounted receiver assembly 16 and the support stanchion 18.

Figure 2:
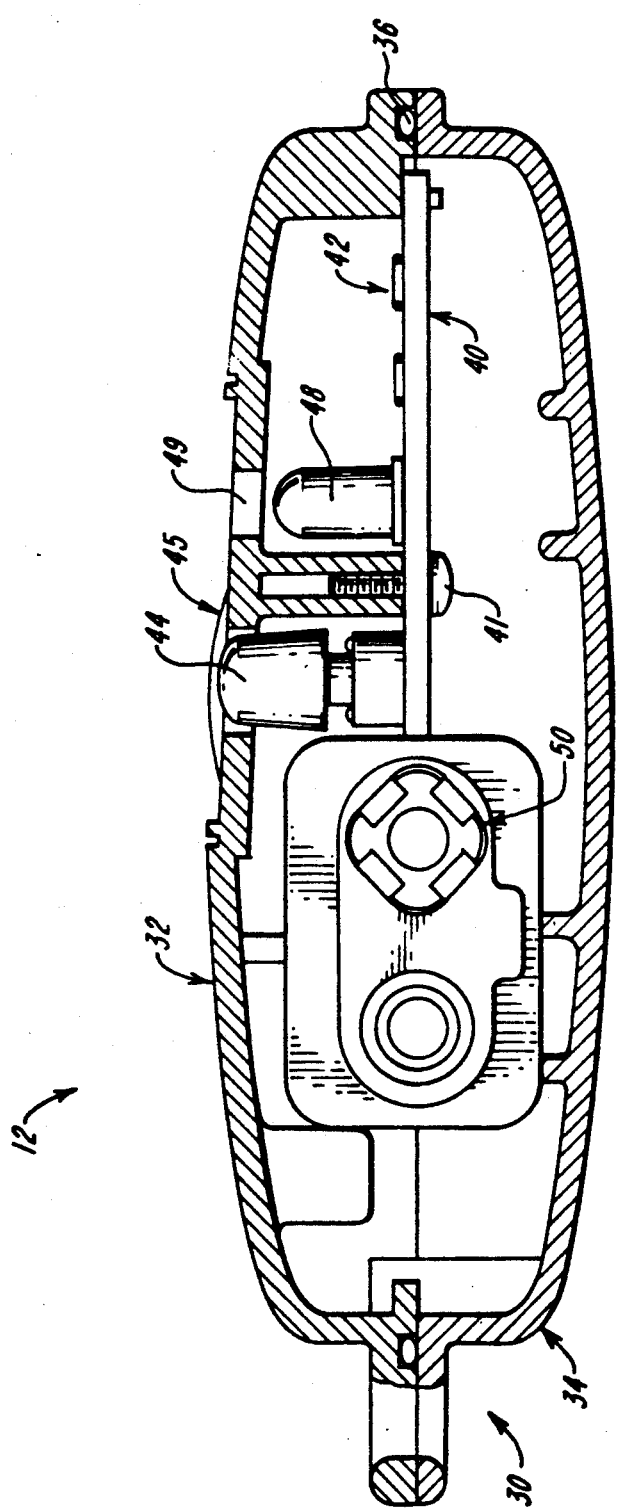
FIG. 2 is a cross-sectional view of a transmitter assembly for activating the top mounted buoy signaling device of the present invention.

An exemplary embodiment of the hand-held, low-power transmitter assembly 12 is illustrated in FIG. 2. The transmitter assembly 12 includes a housing 30, a printed circuit board 40 and an electric power supply 50.

The transmitter housing 30 may be formed from a durable, light-weight, corrosion-resistant insulative material such as plastic, for example an ASA, which is suitable for extended exposure in the marine environment. The housing 30 includes a first and second housing members 32, 34, respectively. The first and second housing members 32, 34 are configured to be readily mated in combination or demated for maintenance. A sealing means 36 such as a gasket or O-ring is interposed between the first and second housing members 32, 34 to environmentally seal the housing 30 against the marine environment.

The printed circuit board 40 is mounted within the housing 30 by a mounting means 41 such as a screw. The electronic components and interconnect circuitry forming the transmitter circuit, as discussed hereinbelow in greater detail, are disposed on the printed circuit board 40. Integrally printed on the circuit board 40 and electrically interconnected with the transmitter circuit is a transmitter antenna 42.

An extended pushbutton 44 is electrically interfaced with the transmitter circuit and extends through the first housing member 32. Depression of the extended pushbutton 44 activates the transmitter circuit to cause the transmission of a coded address signal 55. The transmitter assembly 12 may also include a light emitting diode 48 electrically interfaced with the transmitter circuit and a transparent window 49 disposed in the first housing member 32 in-line with the LED 48. Activation of the transmitter circuit causes the LED 48 to be activated, thereby providing a visual indication that the coded address signal 55 is being transmitted.

A flexible membrane 45 is adhered to the outer surface of the first housing member 32 superjacent the extended pushbutton 44 and the transparent window 49. The membrane 45 provides environmental sealing for the extended pushbutton 44 while permitting depression thereof. In addition, the membrane 45 is configured to permit viewing of the visual signal generated by the LED 48.

The configuration and operational characteristics of the transmitter assembly 12 as described hereinabove provide several inherent advantages. The flexible membrane 45 provides the user with tactile feedback on the operation of the extended pushbutton 44. The housing 30 is configured to float in the marine environment such that it may be easily recovered if dropped in the water. The transmitter circuit of the transmitter assembly 12 is designed to automatically transmit an extended coded address signal 55 upon pushing the extended pushbutton 44 and continuing after release of the extended pushbutton 44.

The electrical power supply 50 is mounted within the housing 30 and electrically interfaced with the transmitter circuit. Typically, the electrical power supply 50 is an off-the-shelf battery such as a 9-volt battery. The configuration of the housing 30 and the availability of off-the-shelf batteries facilitates replacement of the electrical power supply 50.

The top mounted receiver assembly 16 is exemplarily illustrated in FIGS. 3A, 3B. The receiver assembly 16 includes a housing 60, a printed circuit board 70 and a lamp subassembly 76. The housing 60 has a generally cylindrical configuration and may be formed from a durable, light-weight, corrosion-resistant insulative material such as plastic, for example an ASA. Internal slots 61 are integrally formed in the housing 60 to facilitate installation, positioning, and removal of the printed circuit board 70.

One end of the housing 60 is formed as a threaded neck 62 configured for mating with the support stanchion 18. An O-ring 63 operative as a "lock washer" may be disposed on the threaded neck 62 to facilitate mating. The other end 64 of the housing 60 is threaded to receive the lens 80 of the lamp subassembly 76. An O-ring sealing means 65 is disposed on the threaded end 64 to provide environmental sealing between the lens 80 and the housing 60.

The printed circuit board 70 is slidably mounted within the receiver housing 60 by press fitting the board 70 into the slots 61. The electronic components and interconnect circuitry forming the receiver circuit, as discussed hereinbelow in greater detail, are disposed on the circuit board 70. Integrally printed on the circuit board 70 and electrically interconnected with the receiver circuit is a receiver antenna 72 (FIGS. 8A, 8B) configured for reception of the coded address signal. An RF shield 74 is disposed about the receiver circuitry for shielding the components and interconnects thereof from stray radiation and handling during exchanging of the batteries.

The power supply 75 for the receiver assembly 16 consists of off-the-shelf batteries. For the embodiment described herein, the power supply 75 consists of four 1.5-volt serially connected batteries mounted in battery holders 75h. The battery holders 75h are disposed on surface of the circuit board 70 opposite the receiver circuit components.

The lamp subassembly 76 consists of a lamp holder 77, a removable lamp 78 and the lens 80. The lamp holder 77 is configured to be soldered into the circuit board 70 for electrical interconnection with the receiver circuit. In one embodiment, the lens 80 is a cylindrical fresnel lens that surrounds the lamp subassembly 76 and provides a visual signal having a predetermined radiation pattern.

For the cylindrical fresnel lens 80, the predetermined radiation pattern is 360 degrees horizontally and plus/minus 10 degrees with respect to the horizontal plane of the lamp 78. A visual signal having the aforedescribed radiation pattern is readily perceived visually from a marine vessel.

The receiver assembly 16 as described hereinabove facilitates maintenance and/or replacement. The lens 80 may be readily removed and the printed circuit board 70 withdrawn from the housing 60 for troubleshooting, battery replacement, presetting or changing address codes and/or insertion of a replacement printed circuit board.

The transmitter assembly 12 of the buoy signaling device 10 is configured to transmit a coded address signal 55 and the receiver assembly 16 of the buoy 14 is operative upon receipt of the coded address signal 55. Individual receiver assemblies 16 may have a unique or quasi-unique address to preclude inadvertent activation of nearby devices. A plurality of buoy signaling devices 10 marking a defined area such as a channel or navigation hazard, or a mooring, docking or slip facility would have equivalent quasi-unique addresses so that all devices may be activated simultaneously.

Figure 4:
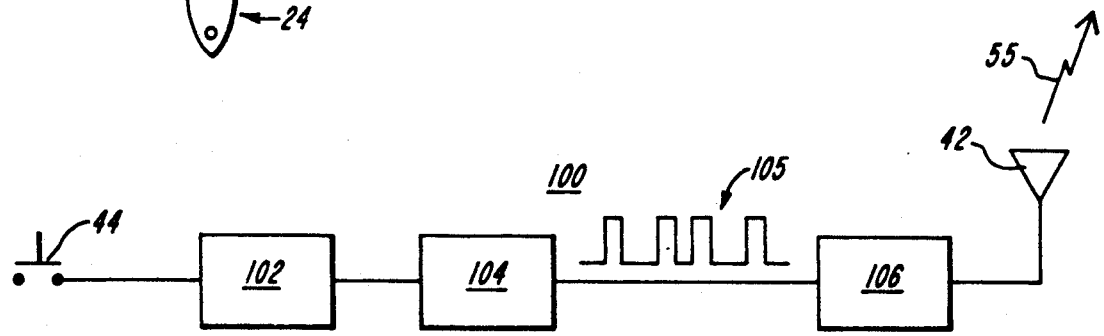
FIG. 4 is a block diagram of a transmitter assembly.
Figure 5:
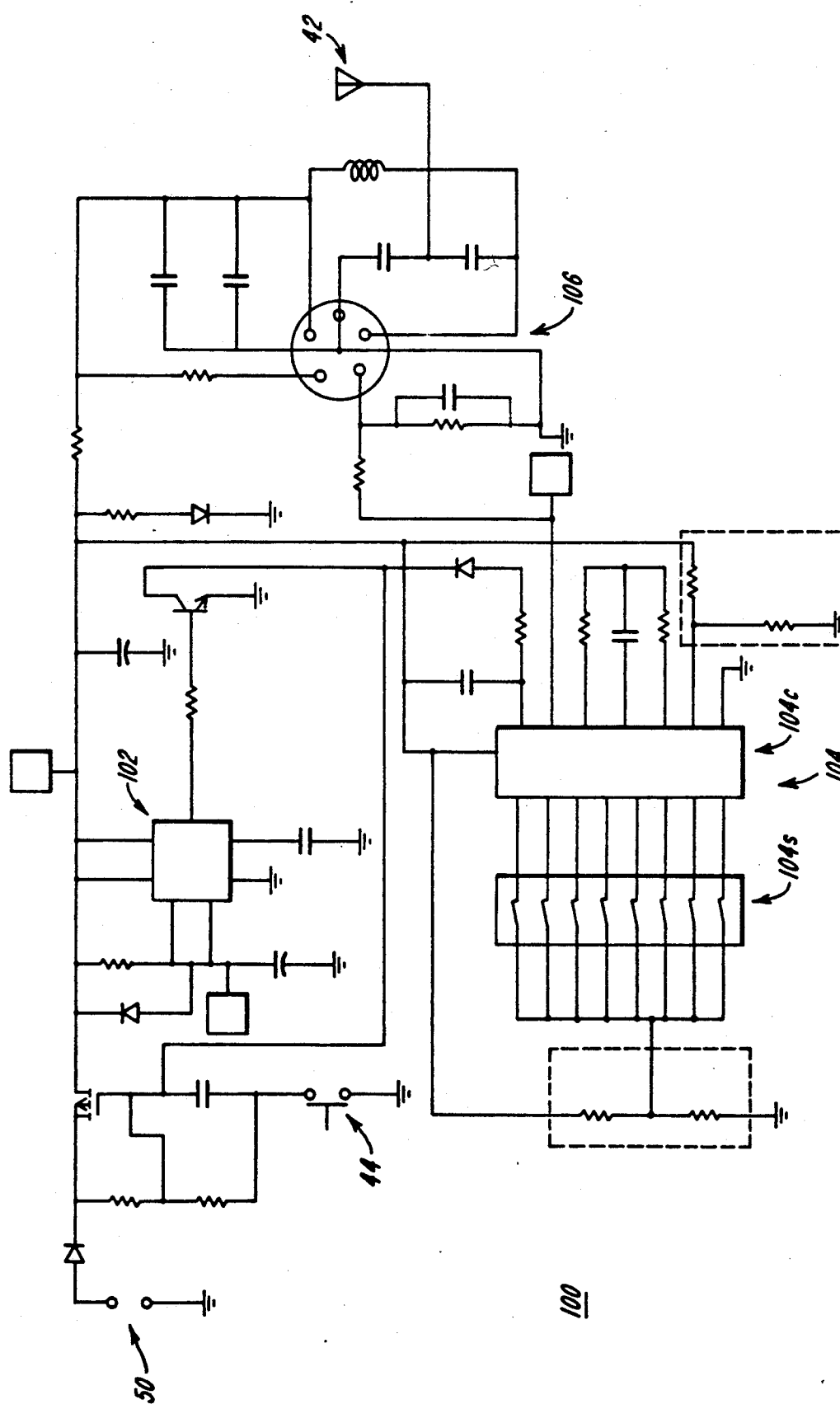
FIG. 5 is a schematic of a printed circuit board layout for the transmitter assembly of FIG. 4.

A block diagram for a transmitter circuit 100 for generating the coded address signal 55 is illustrated in FIG. 4 and the corresponding electronic schematic for the transmitter circuit 100 formed on the circuit board 40 is illustrated in FIG. 5. The transmitter circuit 100 includes the extended pushbutton 44, a clock subcircuit 102, an encoder subcircuit 104, an transmitter subcircuit 106 and the transmitter antenna 42.

The transmitter circuit 100 is energized by depression of the extender pushbutton 44. The clock subcircuit 102 generates an enable pulse that enables the encoder subcircuit 104. The encoder subcircuit 104 generates preset digital coded address signals 105. The digital signals from the encoder subcircuit 104 are coupled to the transmitter subcircuit 106 to modulate a carrier frequency generated therein. The modulated carrier signal broadcast by the transmitter antenna 42 is the coded address signal 55.

As exemplarily illustrated in FIG. 5, the encoder subcircuit 104 includes a encoder chip 104c and an encoder switch 104s. The encoder switch 104s is operative to preset the bit pins of the encoder chip 104c such that the transmitter circuit 100 will generate a unique coded address signal 55.

The encoder chip 104c illustrated in the schematic of FIG. 5 is a low-power complementary MOS manufactured by Motorola Inc. and identified as part number MC145026. The technical and operating characteristics of the MC145026 encoder are described in the handbook Motorola CMOS/NMOS Special Functions Data, pp. 7-27 to 7-37 (Motorola Inc. 1984.

As exemplarily illustrated in FIG. 5, the encoder chip 104c is set up to encode eight inputs (pins 1-7, 9) of address information as defined by the settings of encoder switch 104s. Each enable pulse coupled through pin 14 enables the encoder chip 104c to serially transmit nine eight-bit address words 105 via pin 15. The digitized address words 105 effect modulation of the carrier frequency generated by the oscillator of the transmitter subcircuit 106.

Figure 6:
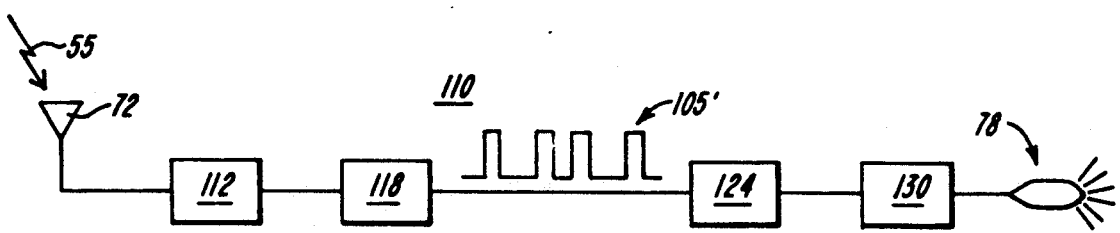
FIG. 6 is a block diagram of a receiver assembly for the top mounted buoy signaling device.
Figure 7:
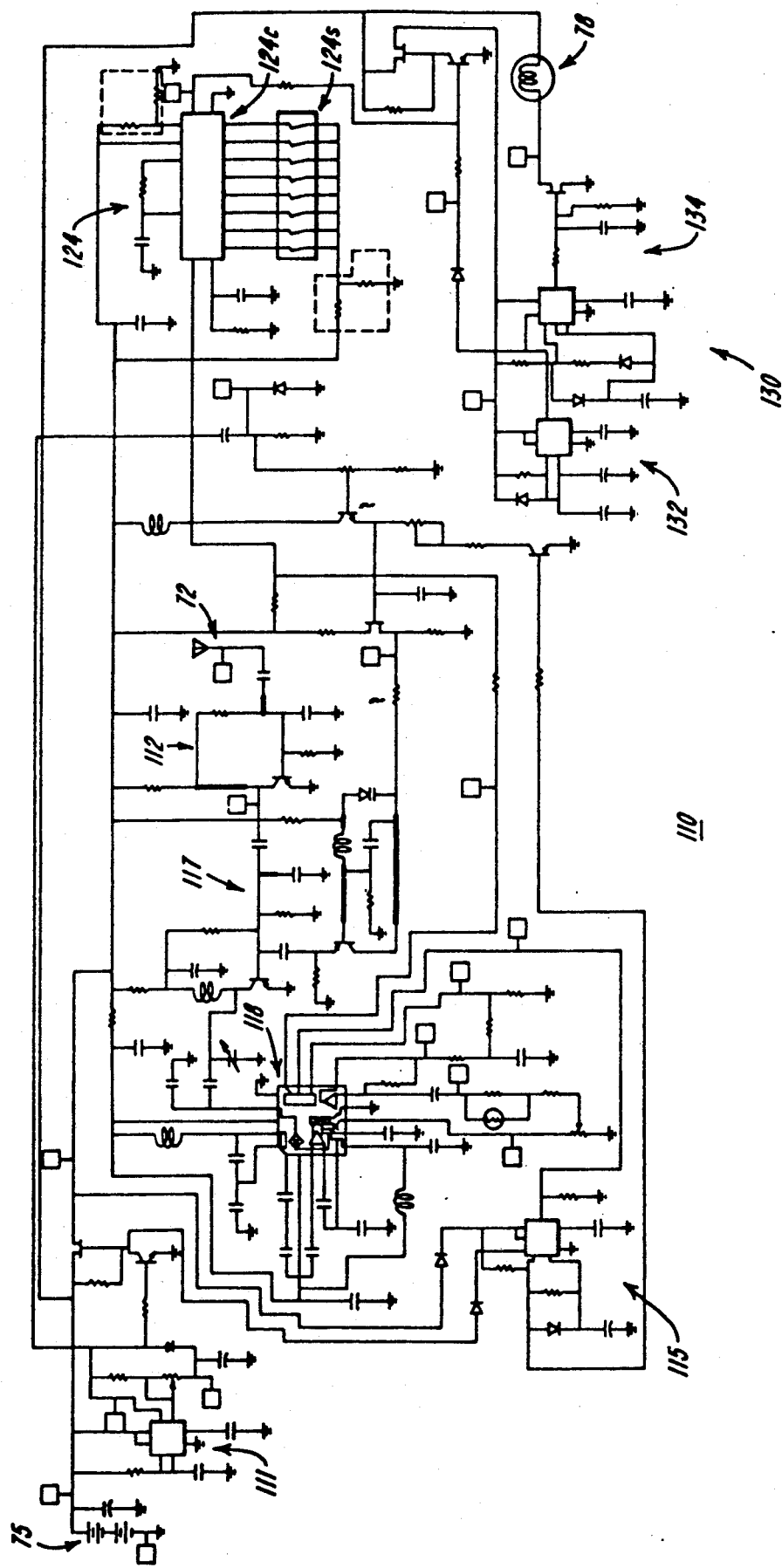
FIG. 7 is a schematic of a printed circuit board layout for the receiver assembly of FIG. 6.
Figure 8A:
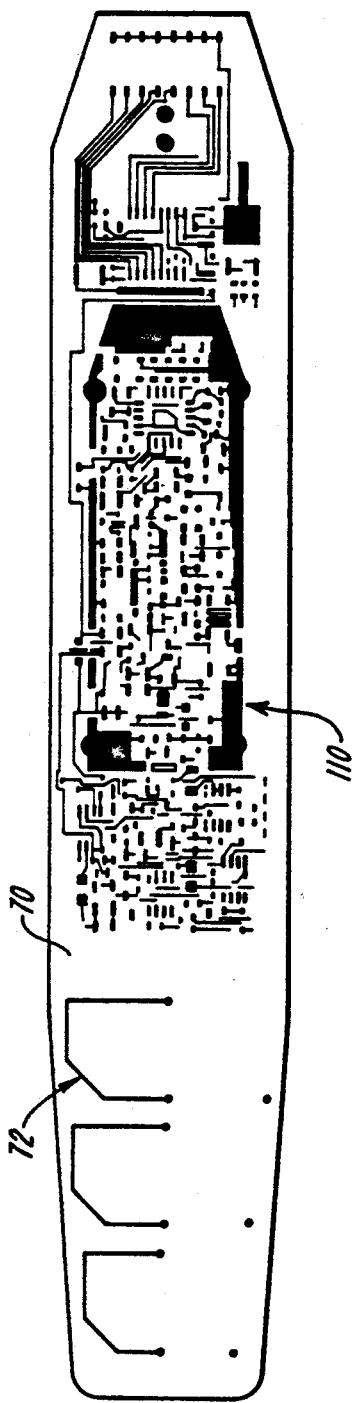
FIGS. 8A, 8B are plan views of the printed circuit board layouts for the receiver assembly of FIG. 7.
Figure 8B:
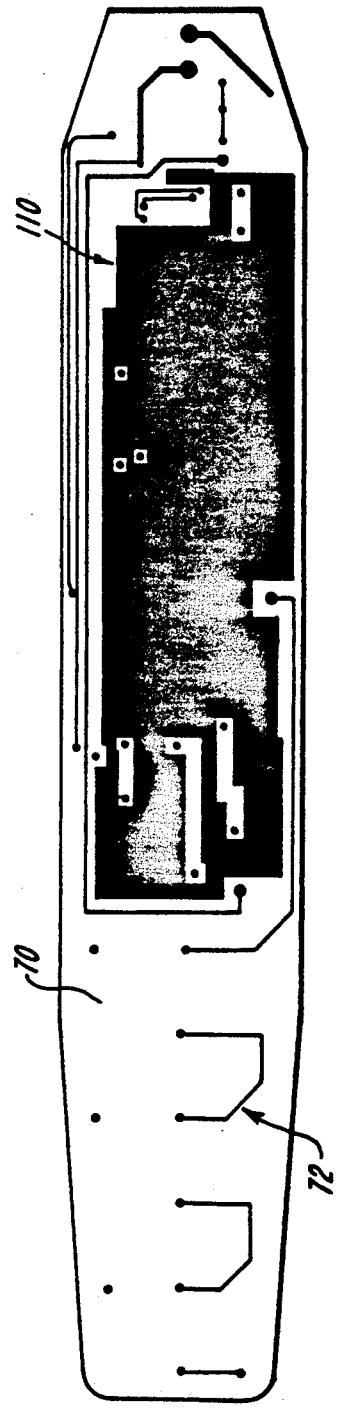

A block diagram for a receiver circuit 110 for decoding the coded address signal 55 is illustrated in FIG. 6 and the corresponding electronic schematic for the receiver circuit 110 formed on the circuit board 70 is illustrated in FIGS. 7, 8A, 8B. The receiver circuit 110 includes the receiver antenna 72, an RF subcircuit 112, an detector subcircuit 118, a decoder subcircuit 124 and lamp driver subcircuit 130.

The RF subcircuit 112 is tuned for reception of the carrier frequency of the coded address signal 55. The detector subcircuit 118 detects the signal to provide digitized address words 105'. The digitized address words 105' are coupled to the decoder subcircuit 124 for a comparison against a preset coded address stored therein. For address matches, the decoder subcircuit 124 provides an output signal which enables the lamp driver subcircuit 130. The lamp driver subcircuit 130 activates the lamp 78 for operation in a predetermined manner.

As exemplarily illustrated in FIG. 7, the decoder subcircuit 124 includes a decoder chip 124c and a decoder switch 124s. The decoder switch 124s is operative to preset the bit pins of the decoder chip 124c to correspond to the unique coded address preset in the corresponding transmitter assembly 12.

The decoder chip 124c illustrated in the schematic of FIG. 7 is a low-power complementary MOS manufactured by Motorola Inc. and identified as part number MC145028. The technical and operating characteristics of the MC145028 decoder are described in the handbook Motorola CMOS/NMOS Special Functions Data, pp. 7-27 to 7-37 (Motorola Inc. 1984), incorporated herein by reference. In particular, the MC145028 decoder treats all serially received bits of the address words provided by the detector subcircuit 118 as address bits.

A match between the address bits provided by the detector subcircuit 118 and the address bits preset in the decoder chip 124c causes the decoder subcircuit 124 to provide a valid transmission output signal on pin 11. The valid transmission output signal enables the lamp driver subcircuit 130.

The exemplary lamp driver subcircuit 130 illustrated in FIG. 7 includes a master timer subcircuit 132 and a flash timer subcircuit 134. The master timer subcircuit 132 is operative to hold the lamp driver subcircuit 130 in the enabled condition for a predetermined period of time. During this predetermined period of time, the flash timer subcircuit 134 periodically energizes the lamp 78 to provide a flashed output. The flashed output is distinctive and easily identified against a backlit environment.

The detector subcircuit 118 includes a detector chip 118d such as the low-power narrow-band FM IF chip, part number MC3359, manufactured by Motorola Inc. The MC3359 chip includes an oscillator, mixer, limiting amplifier, AFC, quadrature discriminator, op/amp, squelch, scan control, and mute switch.

Various other subcircuits may be incorporated the in the receiver circuit 110 as exemplarily illustrated in FIG. 7. For example, a power timing subcircuit 111 may be utilized to periodically activate the receiver circuit 110 for operation during a predetermined short time interval. Periodic operation of the receiver circuit 110 extends the useful operating lifetime of the power supply 75. The receiver circuit 110 may also include circuitry such as a mixer subcircuit prior to the detector subcircuit 118 and a sweep subcircuit 115 coupled to the RF subcircuit 112 such that the RF subcircuit 112 searches for the coded address signal 55 over a predetermined bandwidth.

A variety of modifications and variations of the present invention are possible in light of the above teachings. It is therefore to be understood that within the scope of the appended claims, the present invention may be practiced otherwise than as specifically described hereinabove.

What is claimed is:

1. A top mounted buoy signaling device for marine navigation, comprising:
   remote transmitter assembly means for generating a coded address signal to selectively activate said top mounted buoy signaling device, said remote transmitter assembly means including encoder subcircuit means having a preset coded address for generating a digitized coded address for modulating a carrier signal to provide said coded address signal;
   means for disposing said top mounted buoy signaling device in a marine environment; and
   receiver assembly means top mounted in environmentally sealed combination with said signaling device disposing means in spaced apart relation from water in the marine environment for receiving said coded address signal, said receiver assembly means including
   detector means for detecting said coded address signal to provide the digitized coded address embodied in said coded address signal,
   decoder means coupled to said detector means and having stored therein a coded address corresponding to said preset coded address of said transmitter assembly means and operative in response to a match between said stored coded address and said preset coded address for generating a valid transmission signal; and
   lamp driver means coupled to said decoder means and operative in response to said valid transmission signal for providing a light output in a predetermined radiation pattern for a predetermined period of time for marine navigation.

2. The top mounted buoy signaling device of claim 1 wherein said lamp driver means comprises:
   lamp subassembly means for providing said light output for marine navigation;
   first means operative in response to said valid transmission signal for maintaining said lamp driver mean in an operative condition for said predetermined period of time; and
   second means coupled to said lamp subassembly means and operative during said predetermined period of time for periodically energizing said lamp means to provide said light output for marine navigation.

3. The top mounted buoy signaling device of claim 1 wherein said receiver assembly means further comprises power timer subcircuit means for periodically energizing said receiver assembly means for a predetermined short interval for reception of said coded address signal.

4. The top mounted buoy signaling device of claim 2 wherein said receiver assembly means further comprises antenna means for receiving said coded address signal and means for powering said receiver assembly means and wherein said antenna means, said detector means, said decoder means and said first and second means of said lamp driver means are printed on a circuit board and further wherein said lamp subassembly means and said power means are mounted on said circuit board.

5. The top mounted buoy signaling device of claim 4 further comprising housing means configured for internal mounting of said circuit board and wherein said housing means is configured for top mounting in combination with said buoy means in spaced apart relation from water in the marine environment.

6. The top mounted buoy signaling device of claim 5 wherein said lamp subassembly means includes lens means for generating said predetermined radiation pattern, said top mounted buoy signaling device further comprising sealing means intermediate said housing means and said lens means for environmentally sealing said housing means in combination with said lens means.

7. The top mounted buoy signaling device of claim 1 wherein said remote transmitter assembly means includes a clock circuit coupled to said encoder subcircuit, oscillator means coupled to said encoder subcircuit for generating said carrier signal and operative in response to said digitized coded address to modulate said carrier signal and an antenna coupled to said oscillator means for transmitting said coded address signal and wherein said clock circuit, said encoder subcircuit means, said oscillator means and said antenna are printed on a circuit board.

8. The top mounted buoy signaling device of claim 7 wherein said transmitter assembly means further includes housing means configured for internal mounting of said circuit board of said transmitter assembly means and further configured for floating in the marine environment.

* * * * *

UNITED STATES PATENT AND TRADEMARK OFFICE
CERTIFICATE OF CORRECTION

PATENT NO. : 5,016,227
DATED : May 14, 1991
INVENTOR(S) : Turner, Jr.

It is certified that error appears in the above-indentified patent and that said Letters Patent is hereby corrected as shown below:

Column 6, line 51, "pp. 7-27 to 7-37 (Motorola Inc.1984." should read --pp.7-27 to 7-37 (Motorola Inc. 1984). --;

Column 7, line 9, "diver subcircuit 130" should read --driver subscircuit 130--;

Signed and Sealed this

Twenty-eighth Day of December, 1993

Attest:

BRUCE LEHMAN

*Attesting Officer*     Commissioner of Patents and Trademarks